L. H. NASH.
WATER METER.
APPLICATION FILED JULY 23, 1910.

1,024,741.

Patented Apr. 30, 1912.

Witnesses:

Lewis Hallock Nash, Inventor
By his Attorneys

UNITED STATES PATENT OFFICE.

LEWIS HALLOCK NASH, OF SOUTH NORWALK, CONNECTICUT.

WATER-METER.

1,024,741.  Specification of Letters Patent.  Patented Apr. 30, 1912.

Application filed July 23, 1910. Serial No. 573,368.

*To all whom it may concern:*

Be it known that I, LEWIS HALLOCK NASH, a citizen of the United States, and a resident of South Norwalk, in the county of Fairfield and State of Connecticut, have invented certain new and useful Improvements in Water-Meters, of which the following is a specification.

My invention relates to new and useful improvements in water meters and more particularly to that type wherein motion is transmitted from the measuring mechanism to the registering mechanism by means of a magnet driven by the measuring mechanism.

Meters of the particular type just described, while in many respects being highly efficient, have proved objectionable in one particular in that when employed with the ordinary rotary form of measuring piston, it has been necessary to gear down the driving magnet so that it will rotate at a speed sufficiently low to secure satisfactory results in driving the registering mechanism, and the mechanism to produce the relatively slow speed of the magnet is of such delicate nature that it is liable to become worn out or deranged by continuous use.

It is therefore the object of my present invention to provide a novel combination of elements which will enable me to dispense with the reducing gearing hitherto necessary to drive the magnet, resulting in the simplification of the mechanism and an increase in its efficiency. In order to accomplish this result I find that I may utilize a certain motion in a class of meters known as revolving piston meters wherein the piston has a motion of rotation on its axis and of revolution around the center of the case in which it is contained and connect the magnet rigidly to the piston, so that the reducing gearing is unnecessary, it being understood that the piston will rotate at a speed low enough to produce the desired results.

I have fully and clearly illustrated my invention in the accompanying drawings to be taken as a part of this specification, and wherein—

Figure 1:
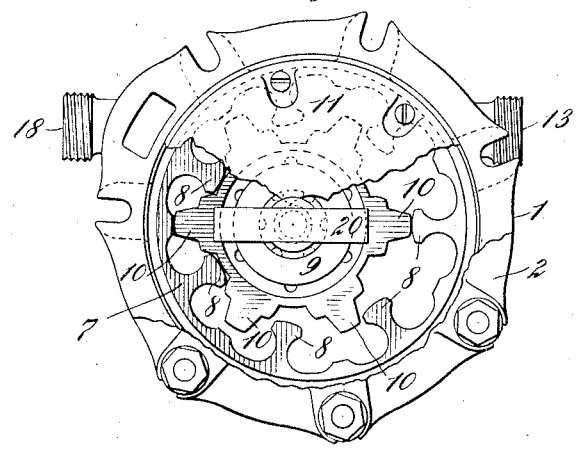
Figure 2:
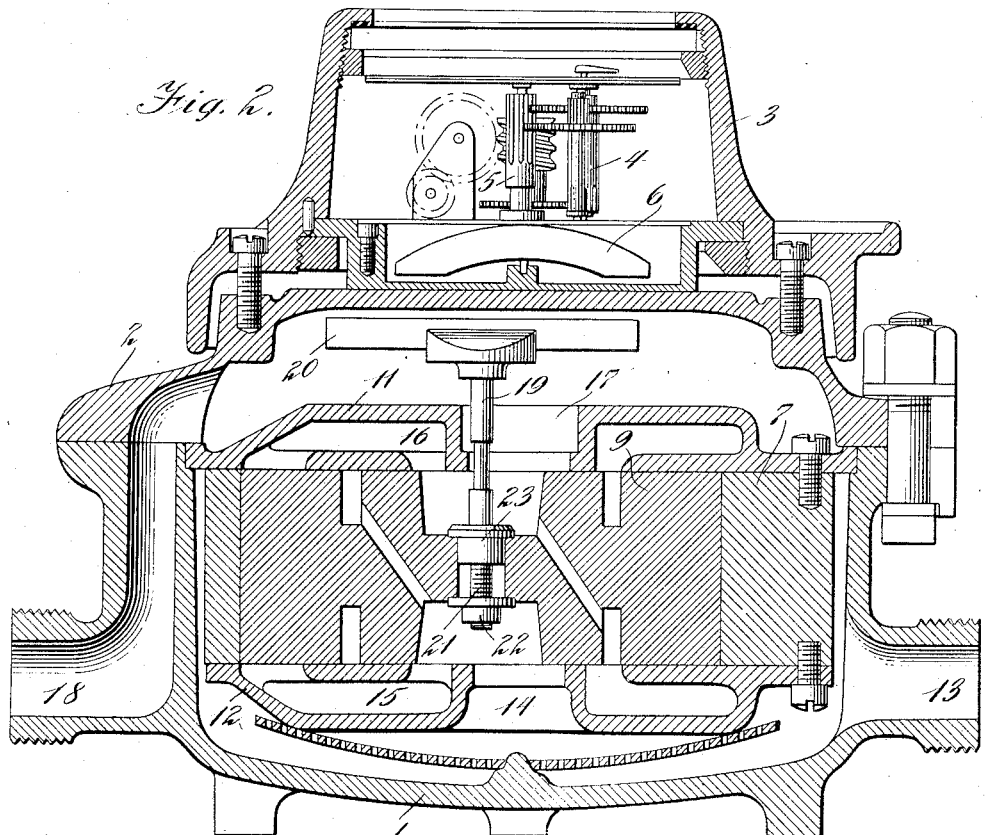

Figure 1 is a plan view of a measuring mechanism and its case with the register and the cover to the case removed therefrom. Fig. 2 is a transverse vertical section through the complete meter.

Referring to the drawings by characters of reference, 1 designates the case for the measuring mechanism, the same being closed by an air and water-tight cover 2, upon which is supported the case 3 containing registering mechanism 4, the latter being of any suitable type and including a driving spindle 5 upon which is rigidly mounted a magnet 6.

Arranged within the casing 1 is an annulus 7 having a plurality of inwardly projecting points or projections 8, and arranged within the annulus is a rotary piston 9 provided with a plurality of wings 10 arranged to coöperate with the projections 8 and the recesses between the latter. The number of projections carried by the annulus and piston is immaterial but in the embodiment shown I provide the annulus with seven projections and the piston with six projections as embodying an efficient arrangement. By this arrangement the piston rotates on its axis once for each six revolutions around the case. The piston and annulus are supported between upper and lower ported plates 11 and 12, the annulus being fixed between said plates and the piston being free to rotate between the same. The inlet 13 of the casing communicates with a supply opening 14 in the lower disk 12, whence the water flows into an annular chamber 15 in said disk or plate 12, and thence into the space or spaces between the projections on the annulus and piston to drive the latter, the water passing upward through the spaces between the projections into a space 16 in the upper plate or disk 11, whence the water exhausts into the casing through a central opening 17 in the upper disk and out of the casing through the outlet 18. As this form of piston is well known in the meter art and specifically forms no part of my present invention, I do not deem it necessary to enter into a more detailed description of the same at this time, it being believed that anyone skilled in the art can understand the construction and operation of the same from the description already given. Centrally mounted upon the piston and secured therein is a spindle 19 which projects upward through the opening 17 in the upper disk 11 and carries on its upper end a magnet 20 which is arranged to rotate in a plane parallel to that in which the magnet 6 heretofore described rotates. The spindle may be secured in position in any suitable manner but I prefer to thread the shank of the same as at 21, and secure the same to the piston by clamping nuts 22, 23 in a manner which will be clearly understood from the drawing.

In the operation of the device the revolution of the piston in the case chamber carries the magnet 20 around in a similar orbit and rotates the same once for every six revolutions of the piston, which rotation of the magnet 20 causes the magnet 6 to operate in the same direction as the magnet 20, so that one rotation of the magnet 20 causes the magnet 6 to rotate once in every six revolutions of the piston, and in that way the registering device is driven at the proper speed without the use of an intermediate train of reducing gearing between the piston and the driving magnet. I preferably make the driving magnet 20 of such length that during its movement with the piston while the latter is making its orbit around the case, it will always have the magnet 6 well within its influence so that the magnet 6 will be driven evenly and effectively at all periods of rotation of the magnet 20.

Having thus described my invention, what I claim as new and desire to secure by Letters Patent is:—

1. The combination in a water meter, of a piston, means whereby the piston has a motion of rotation on its axis and a motion of revolution, a magnet fixed to the piston so as to rotate and revolve in the same manner as the piston, and a magnetic register driven by said magnet.

2. The combination in a water meter, of a piston, means whereby the piston has a motion of rotation on its axis and a motion of revolution, a spindle rigidly secured to said piston, a magnet driven by said spindle so as to rotate and revolve in the same manner as the piston, and a magnetic register driven by said magnet.

3. The combination in a water meter, of a piston, means whereby the piston has a motion of rotation on its axis, and a motion of revolution, a spindle rigidly secured to said piston, a magnet rigidly mounted on the spindle so as to rotate and revolve in the same manner as the piston, and a magnetic register driven by said magnet.

In testimony whereof I have signed my name to this specification in the presence of two subscribing witnesses.

LEWIS HALLOCK NASH.

Witnesses:
  M. E. McNinch,
  C. G. Heylman.